United States Patent [19]

Chang et al.

[11] Patent Number: 5,208,766
[45] Date of Patent: May 4, 1993

[54] AUTOMATED EVALUATION OF PAINTED SURFACE QUALITY

[75] Inventors: David B. Chang, Tustin; I-Fu Shih, Los Alamitos; Michael E. Stickney, El Toro, all of Calif.

[73] Assignee: Hughes Aircraft Company, Los Angeles, Calif.

[21] Appl. No.: 611,597

[22] Filed: Nov. 13, 1990

[51] Int. Cl.⁵ .................... G01N 21/55; G06F 15/20
[52] U.S. Cl. .................... 364/552; 356/445; 356/446; 364/576; 382/41
[58] Field of Search .............. 356/237, 376, 391, 392, 356/394, 445, 446; 364/552, 576; 382/41

[56] References Cited

U.S. PATENT DOCUMENTS

| | | | |
|---|---|---|---|
| 4,846,578 | 7/1989 | Morita et al. | 356/446 |
| 4,948,258 | 8/1990 | Caimi | 356/376 |
| 4,960,332 | 10/1990 | Földi et al. | 356/391 X |
| 5,051,602 | 9/1991 | Sting et al. | 356/445 X |
| 5,092,676 | 3/1992 | Harata et al. | 356/446 X |
| 5,155,558 | 10/1992 | Tannenbaum et al. | 382/8 X |

*Primary Examiner*—Edward R. Cosimano
*Attorney, Agent, or Firm*—M. W. Sales; Terje Gudmestad; W. K. Denson-Low

[57] ABSTRACT

Human aesthetic evaluation of a finished painted surface, such as an automotive body, is automatically simulated by analyzing a distorted reflected test pattern from the finished surface. Fourier power spectra of the distorted test pattern are generated to form a parameterization of the reflected distorted test pattern. A correlation is statistically made to reference Fourier power spectra, each of which has been associated with a specific human aesthetic evaluation, such as wetness, dullness, softness, brightness, and the like. The Fourier power spectra of the distorted reflected image are automatically generated through a digitized two dimensional pixel map, which are mapped into functions of the edge direction and edge intensity of the pixels. The functions are then Fourier transformed into Fourier power spectra and correlated with reference reflected patterns. Alternatively, the Fourier power spectrum of the distorted reflected pattern is optically generated by use of collimated coherent light in a Fourier transform lens. After that, the necessary parameterization is extracted from the optical Fourier transform plane and correlated to previously recorded aesthetic human evaluation. A segmentation parameter is also used for correlation with a reference segmentation indicator.

22 Claims, 3 Drawing Sheets

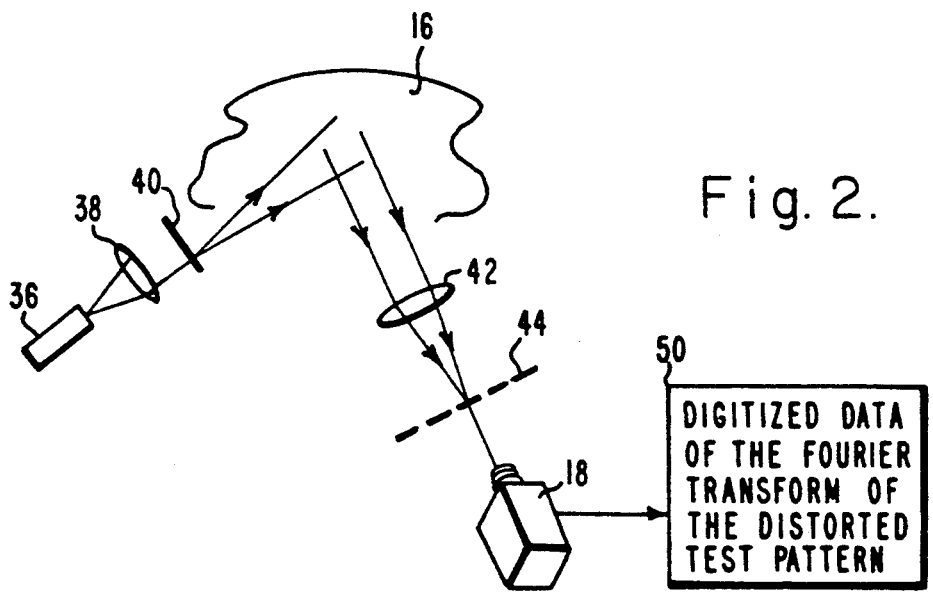
Fig. 2.
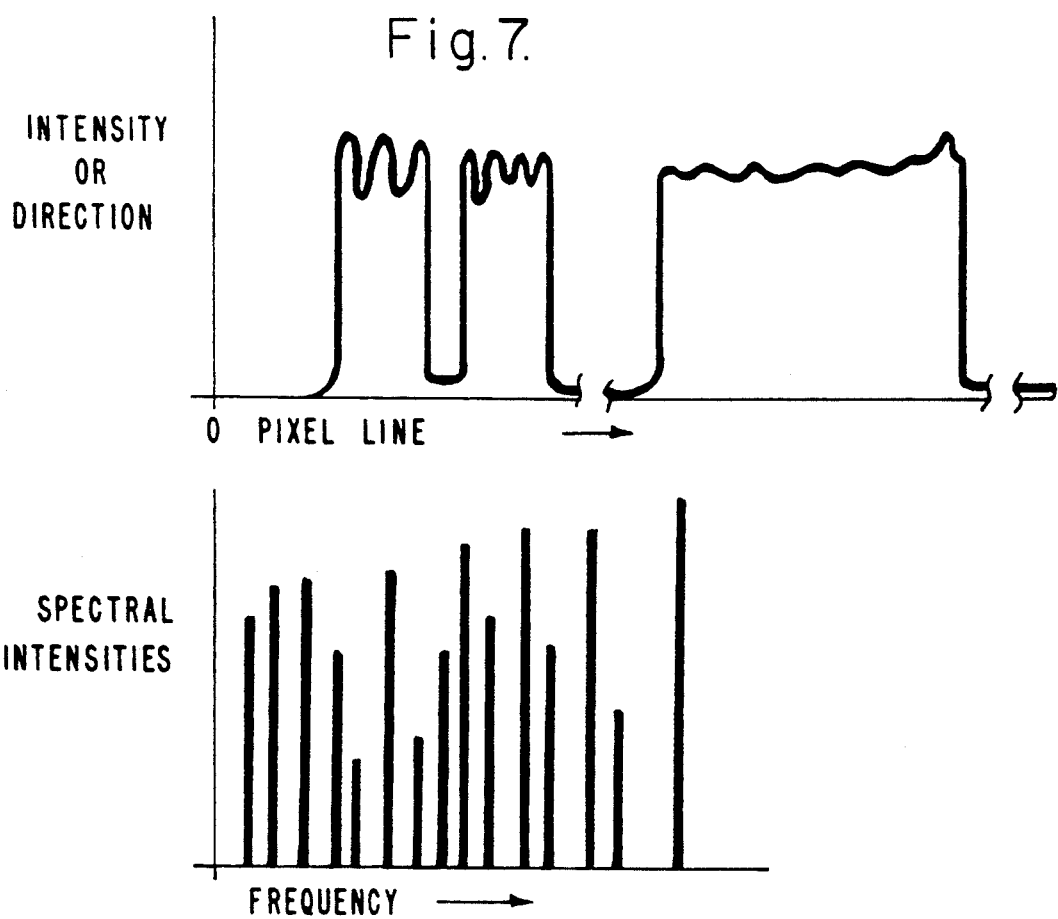
Fig. 7.
Fig. 8.

AUTOMATED EVALUATION OF PAINTED SURFACE QUALITY

BACKGROUND OF THE INVENTION

1. Field of the Invention

The invention relates to the field of quality control of finished painted surfaces and in particular to inspection and evaluation of the quality of a painted surface, such as a painted automobile surface.

2. Description of Prior Art

The purchasing decision made with respect to a private automobile is typically heavily influenced by the aesthetic appearance of the automobile. Among the factors that constitute the aesthetic appearance of an automobile is the finished quality of the painted surface. The colors, lusters and finishes that are popular depend in part on fashion, but a deep lustrous finish having a liquid or wet deep mirror-like appearance is generally thought attractive and desirable by the purchaser.

In the prior art, a panel of persons representing a random sample of purchasers views and subjectively evaluates the quality of the painted surface. The panel rates the quality of the paint finish based on several criteria as set forth in a questionnaire. Scores from the panel are then averaged to obtain an average evaluation of the quality of the painted surface. The prior process of using human panels for finish evaluation is extremely time consuming and expensive. At best, such evaluation can only be done periodically. There is also a statistical variation among the panels since truly random samples of human subjects cannot always be practically obtained.

Although the prior art has devised various types of apparatus by which various aspects of a painted surface can be measured, such as a distinctness of image (DOI) meter or a gloss meter, readings from neither one of these prior art apparatus correlates well with the subjective judgments of human panels evaluating the same painted surface.

Therefore, an apparatus and methodology is needed to replace the current paint finish evaluation technique, of periodically using a statistically random group of purchasers or potential purchasers to evaluate quality of the painted finish surface.

BRIEF SUMMARY OF THE INVENTION

The invention is a method and apparatus for automatically deriving a simulated human subjective judgment on the quality of a painted surface comprising the steps of projecting a test pattern onto a finished surface. At least one Fourier power spectrum for a best surface determined by human evaluation is stored. A Fourier power spectrum of a distorted reflected image of the projected test pattern is generated to provide parameterization of the distorted reflected test pattern. The spectrum is generated according to a plurality of optical parameters relating to the distortions of the reflected test pattern. The parameterization of the distorted reflected test pattern is correlated within the apparatus with at least one of the Fourier power spectrum determined during subjective human evaluation of a best finished surface. Automatic evaluation of the finished surface simulating human evaluation is thus obtained.

In one embodiment, the step of generating the Fourier power spectrum comprises the steps of recording the distorted reflected test pattern from the finished surface, and extracting the parameterization of the distorted reflected test pattern from the recording.

The step of recording the distorted reflected test pattern comprises the step of recording the image of the distorted reflected test pattern in a two dimensional pixel map within the apparatus.

The step of extracting the parameterization comprises the step of isolating within the apparatus image distortion due to surface irregularities.

The step of isolating distortion due to surface irregularities comprises the step of removing distortion due to gross geometric distortion from the distorted reflected test pattern by performing a high pass digital filter function that isolates the linear features present in the reflected pattern received. The "perfect finished surface" is determined empirically from a panel of observation.

The method of the invention further comprises the steps of determining within the apparatus: 1) the edge intensity of each pixel; and 2) the edge direction along the parameterized features, to form edge intensity and edge direction functions.

The method comprises the steps of automatically applying a Fourier transform to the edge intensity and edge direction functions to obtain the Fourier power spectrum corresponding to each function.

The step of correlating the Fourier power spectrum comprises the step of statistically correlating frequencies within the Fourier power spectrum corresponding to the distorted reflected test pattern with Fourier frequencies of at least one distorted reflected test pattern, which has been distorted in a predetermined manner and associated with a predetermined aesthetic evaluation.

In another embodiment, the step of projecting the test pattern comprises the step of projecting the test pattern with a coherent collimated light beam.

The step of generating the Fourier power spectrum then comprises the steps of receiving the distorted reflected test pattern from the finished surface with a Fourier power lens, and focusing the distorted reflected test pattern with the Fourier power lens onto a Fourier power plane.

The step of generating the Fourier power spectrum further comprises a step of recording the image focused on the Fourier power plane.

The step of correlating comprises the step of separating the image recorded from the Fourier power plane into components relating to edge direction frequencies and relating to edge intensity frequencies of the distorted reflected test pattern.

The method further comprises the step of generating a measure of decomposition of the distorted reflected image relative to the test pattern.

The invention also can be characterized as an apparatus for providing automatic evaluation of a finished surface correlated to human aesthetic evaluation of the finished surface comprising a mechanism for projecting a test pattern onto the finished surface. A mechanism for recording a distorted reflected test pattern from the finished surface is also included. A mechanism is provided for digitizing the recorded image data. Another mechanism evaluates the digitized image data to parameterize the data in terms of at least one Fourier power spectrum relating to the image data. Finally a mechanism is provided for correlating at least the one Fourier power spectrum to human aesthetic evaluation of the finished surface.

Human evaluation of the finished surface is thus automatically simulated.

The mechanism for digitizing digitizes the distorted reflected test pattern as a two dimensional pixel map, and constructs at least one intensity function and direction function of the pixel map in the manner previously described. The mechanism for evaluating the digitized image comprises a mechanism for generating Fourier power spectra of edge intensity and edge directions of linear features.

The mechanism for digitizing constructs a function of edge intensity of the pixel map and a function of edge direction of the pixel map. The mechanism for generating the Fourier power spectrum of the function generates a Fourier power spectrum of the functions of edge intensity and edge direction of the pixel map.

The mechanism for evaluating the digitized image comprises a mechanism for generating a measure of decomposition of the distorted reflected test pattern relative to the projected test pattern.

The invention is still further characterized as an apparatus for automatically providing evaluations of a painted surface simulating human aesthetic evaluation of the finished surface comprising a mechanism for projecting a test pattern onto the finished surface with a collimated coherent beam of light. A Fourier power lens focuses a distorted reflected test pattern from the finished surface onto a Fourier power plane. A camera records the image focused onto the Fourier power plane. A mechanism is provided for evaluating the Fourier power image to parameterize the reflected distorted test pattern from the finished surface. Finally a mechanism is provided for correlating parameterization of the distorted reflected test image from the finished surface to at least one human aesthetic evaluation of a distorted reflected test pattern from the finished surface.

The invention and its various embodiments may be better visualized by referring to the following drawings.

BRIEF DESCRIPTION OF THE DRAWINGS

FIG. 2 is a highly diagrammatic depiction of another embodiment of the automatic evaluation system of the invention in which an optical Fourier power plane is used.

FIG. 7 is an idealized intensity or direction function of the image.

FIG. 8 is an idealized Fourier power spectrum of the function of FIG. 7.

The invention and its various embodiments may be better understood by now turning to the following detailed description.

DETAILED DESCRIPTION OF THE PREFERRED EMBODIMENTS

A distorted reflected test pattern from a finished surface, such as an automotive body, is analyzed to simulate human aesthetic evaluation of the finished painted surface. Fourier power spectra, for example frequency spectra, of the distorted test pattern are generated to form a parameterization of the reflected distorted test pattern. A correlation is automatically statistically made to reference Fourier power spectra, each of which has been associated with a specific human aesthetic evaluation, such as wetness, dullness, softness, brightness, and the like. The Fourier power spectra of the distorted reflected image are automatically generated through a digitized two dimensional map of pixels that are mapped onto the real number line to define functions of the edge direction and edge intensity of the pixels. The functions are then Fourier powered into Fourier power spectra and correlated with reference Fourier power spectra of reflected patterns. Alternatively, the Fourier power spectrum of the distorted reflected pattern is optically generated by use of collimated coherent light in a Fourier power lens. After that, the necessary parameterization is extracted from the optical Fourier power plane and correlated to aesthetic human evaluation.

The finished quality of a painted surface is based both upon the optical qualities of the paint layer and the macroscopic and microscopic nature of the paint layer surface. A test pattern is projected onto a painted surface that is to be evaluated. The reflected test pattern, which is distorted according to the nature of the painted surface, is recorded. The distorted pattern is then analyzed to determine surface quality. Analysis of the surface quality is made through software algorithms to simulate the human judgment of the surface quality as seen in the distorted reflected pattern. The simulated judgment simulates the judgment that would be made by a random sample of human purchasers.

Figure 9:
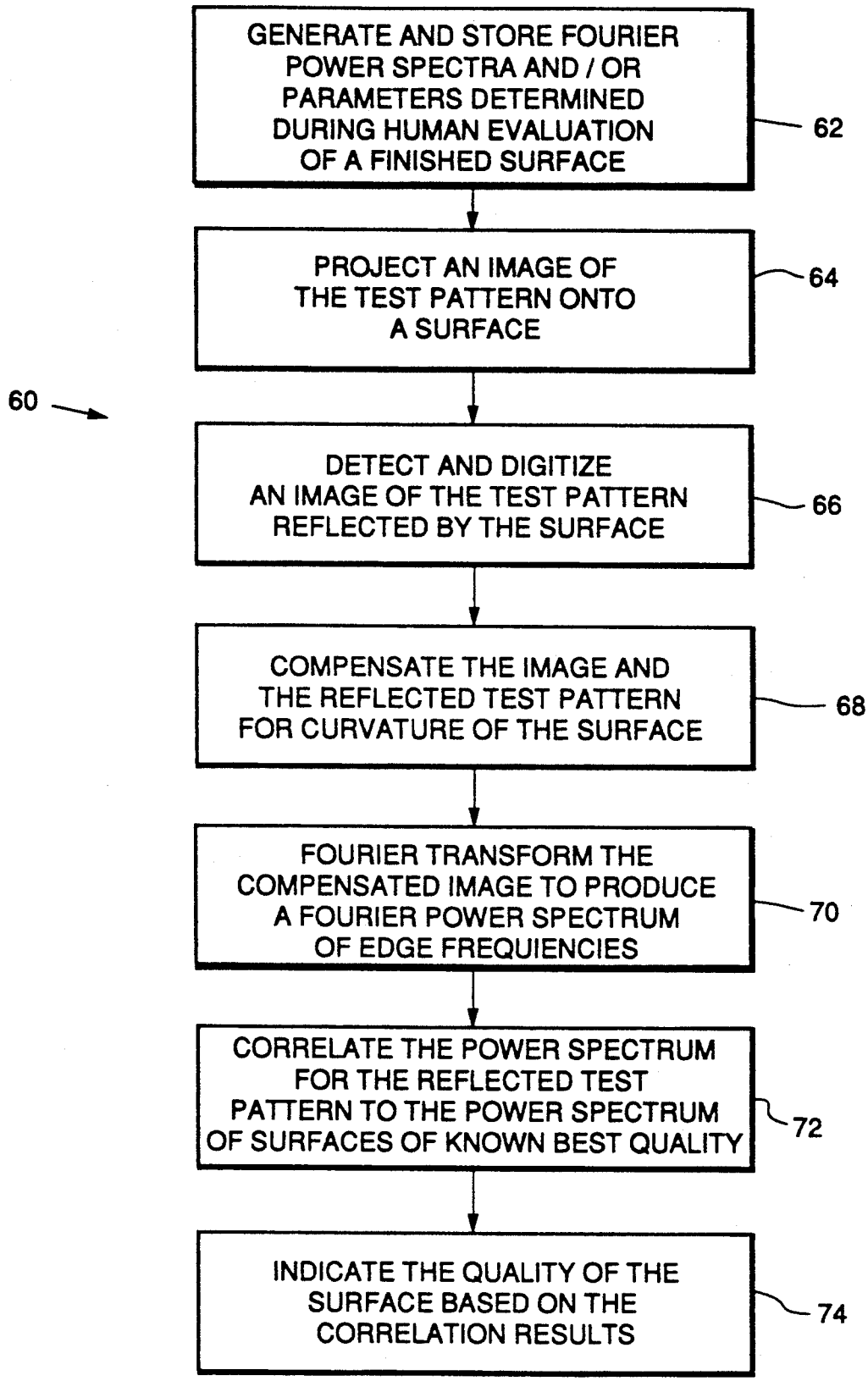
FIG. 9 is a method according to one embodiment of the invention.

FIG. 9 depicts in summary form a method according to one embodiment of the invention in a broad aspect. According to the invention, at least one best Fourier power spectrum is determined by human evaluation of a best surface. This best spectrum, and parameters derived therefrom, are later compared to spectrum from test surfaces to automatically simulate human evaluation.

In the description that follows two embodiments of a means of projecting and recording the pattern are illustrated. Once the distorted pattern is broken down into its component characteristics or parameters, these parameters are then correlated through a software algorithm to simulate the judgment of human panels of the same surface.

As a precondition to effecting any automatic quantitive evaluation of the quality of a painted surface one must first determine what parameters are to be measured or quantified. In the instant invention applicants have chosen the following parameters:

1) the Fourier power spectrum of the edge direction function of a test image reflected off the painted surface;

2) the Fourier power spectrum of the edge intensity function of a test image reflected off the painted surface; and 3) the degree of segmentation (decomposition) of the reflected test image.

To insure that the automated evaluation faithfully simulates human evaluation, a painted surface which has been judged by a human panel to be of "best" quality is processed by apparatus of the invention to generate the three parameters of the "best" painted surface. The three parameters (actually three sets of parameters) are then stored in the computer 20 as reference parameters.

To automatically simulate human judgment of the quality of a test painted surface, the test painted surface is processed by the apparatus and method of the invention to generate the three parameters of the test painted surface. The parameters of the test painted surface are then correlated with the stored parameters of the "best" painted surface. A high degree of correlation indicates that, with a high degree of confidence, a human panel of judges would likely judge the test painted surface to be of similar quality as the "best" painted surface. Thus, the invention can be said to simulate human evaluation of the quality of a painted surface.

Figure 1:
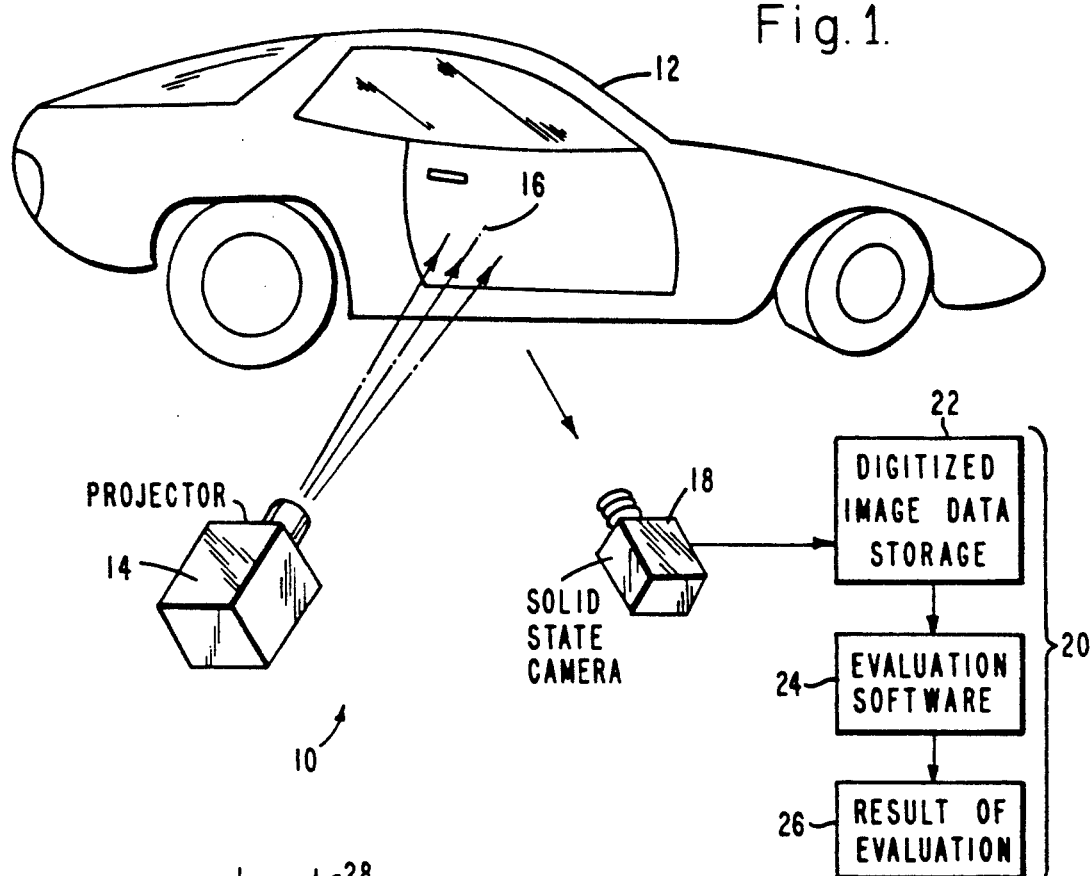
FIG. 1 is a highly idealized schematic of an automatic evaluation system for painted surface quality devised according to the invention.
Figure 3:
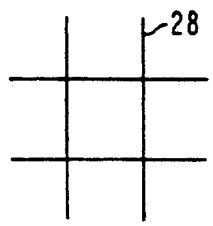
FIG. 3 is a hypothetical test pattern used to illustrate the invention.

Turn now to FIG. 1. An apparatus, generally denoted by reference numeral 10, which is used to make an automatic evaluation of the paint surface quality on an automobile 12, is diagrammatically depicted. A test image (such as that shown in FIG. 3) is projected by projector 14 onto a surface 16 of automobile 12. According to the invention, a variety of test patterns may be employed, such as a rectangular grid pattern, an Air Force test target or any other pattern of colors, lines, dots, shapes, and shades that can be devised, so long as such pattern will bring out the optical parameters of painted surface 16 to best effect with respect to the apparatus and according to the methodology in the invention. Thus the test image of FIG. 3 is by way of example only and determination of a desirable test pattern for any given application can be determined by one skilled in the art using the teachings of this disclosure.

The test pattern is reflected from paint surface 16 to a solid state camera 18. Distortions occur in the reflected pattern according to the macroscopic and microscopic nature of painted surface 16. In any case, the reflected image of painted surface 16 is reduced to a video image within solid state camera 18. The analog output from camera 18 is converted into digital form and stored in memory by a conventional computer, generally designated by reference numeral 20. The stored image is low pass filtered which smooths the lines, that is, removes the high frequency components of the pixel intensity pattern. A median software filter is used, but the process may also be performed optically using optical filters in front of camera 18.

Computer 20 is comprised of a central processing unit, memory, and input and output units, all organized around a conventional bus structure, but has been shown for the purposes of better understanding in FIG. 1 as a flow chart better to describe the steps performed by computer 20. Computer 20 may store power spectra or other data representative of a best image in memory. Thus computer 20 first performs a step 22 digitizing the image data on a line-by-line basis and storing the digitized pixel data in memory. The digitized data is then analyzed as described below and the relevant optical parameters of the optical image are derived as is symbolized by step 24. Then the parameters of the optical image are correlated in step 26 against the subjective evaluations as would be made by a human panel (i.e., the stored reference parameters of the "best" image). In the illustrated embodiment, the panel subjectively evaluates surface 16 for an impression of wetness and depth of image.

Return now to the point in the method where the image reflected from the surface is stored in some form in the memory as a data field. The intensity gradients at each point in the image are calculated and used to replace the data field. Each point on the map has an associated intensity and/or color value. Large differences in nearby gradients are identified and converted into a map representing points corresponding to what is now defined as the curvilinear features of the reflected image. Nearby pixels are linked to define a set of associated pixels that form a curvilinear feature. Some of the curvalinear features may in fact be viewed as segmented portions of a longer curvilinear feature of the test pattern. These segments in turn are linked to form longer units.

Before considering further other embodiments of how the optical surface is viewed and analyzed, consider first what variables make up the optical parameters of a painted finish. Any pattern, which is projected onto a reflective surface, will be distorted first by the curvature or general geometry of the painted surface and secondly by any irregularity of the surface. The additional distortions caused by surface irregularities manifest themselves in terms of changes of the geometric shape of the object, of the image sharpness, and of local image brightness. The curvilinear features extracted from the digitized reflected pattern of the actual painted surface 16 can be analyzed within computer 20. A second order best fit spline curve using conventional bicubic spline techniques is derived for each curvilinear feature of the reflected image. Once the equation of each curvilinear feature is derived, the reflected pattern is processed to straighten out the line or to take out the gross curvilinear features assumed to have a geometric origin thereby leaving only the high frequency variations.

The data is now representative of the optical quality of the surface reflection. What is left is the distortion of the test pattern caused just by the painted surface irregularities. For each pixel on a curve, there is a well defined edge direction and edge intensity arising only from the surface induced distortions. The edge direction of a binary pixel is the geometric normal at the point of the line of the curvilinear feature at the pixel. The edge intensity of a pixel is the derivative of the pixel intensity from the corresponding pixel location in the video image in the direction of the normal.

The data now representing surface irregularity distortion, as opposed to gross geometric distortions, represents a two dimensional image, which is numerically reduced by determining for each binary pixel its maximum edge intensity and its edge direction as defined above.

Two types of real valued functions for each curvilinear feature thus can be formed by computer 20, one defined by the edge directions along a curve and the other defined by the edge intensity functions. Fourier power spectra of these two functions provide information about the optical parameters of the curvilinear reflected features, the visual perception of which would be seen by a human as distinguishable optical characteristics or aspects.

The reflection of the curvilinear features of the test pattern will result in segments that together comprise the entire test pattern as polygonal line segments. The degree of segmentation of the curves of the test pattern also serves as a measurable quantity indicative of optical quality. This parameter is called the segmentation number. Taking the measure of decomposition or segmenting of the reference pattern (the segmentation number) with the Fourier power spectra of edge direction and edge intensity of the pixels (the Fourier components) comprises three features of the optical image.

These features (parameters) in essence characterize or type the image. These parameters can then be statistically correlated within computer 20 based on empirically determined correlations to simulate how a human observer, the hypothetical average panel member, would classify or evaluate an image characterized by these patterns.

Figure 4:
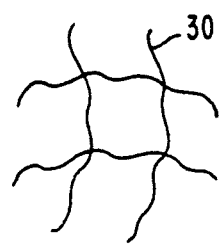
FIG. 4 is the distorted reflected image of the test pattern of FIG. 3.

For the sake of illustration, assume that a reference pattern 28 in the shape of a crossed pattern as shown in FIG. 3 is projected against painted surface 16. The reflected pattern 30 as recorded by solid state camera 18 could, for example, be of the form as shown in FIG. 4. Pattern 30 is distorted from the initial test pattern 28 because of the gross geometry of the automotive surface and the macroscopic and microscopic surface variations of the painted surface.

Figure 5:
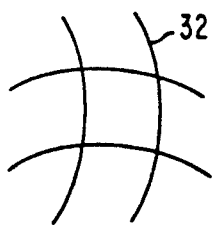
FIG. 5 is the distorted reflected image of the test pattern of FIG. 3 as would be seen if a perfect surface were available to reflect the test pattern.
Figure 6:
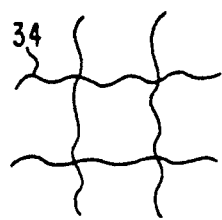
FIG. 6 is the distorted reflected image of the test pattern of FIG. 3 after the gross geometric curvatures of FIG. 5 have been removed.

By empirical measurement or computation it could be known, for example, that the reflected test pattern from a perfect surface would be the pattern 32 shown in FIG. 5. The gross geometric features can also be derived by a best curve fit from the reflected image. The curvature or distortion imparted by the gross geometry of the painted surface as depicted in a comparison between patterns 28 and 32 can be subtracted out from the measured reflected pattern 30 reflected from the actual surface 16 to obtain, if it were constructed into a two dimensional image, a pattern 34 shown in FIG. 6.

Each pixel within image 34 is then analyzed for its edge intensity and edge direction. Thus for each real number representing the position of a pixel within a two dimensional map, two numbers are obtained corresponding to the edge intensity and edge direction.

This is entirely a mathematical construct, which, if it were visualized, would appear to be a mathematical function as shown in FIG. 7, which might appear qualitatively as depicted there. But, the illustration of FIG. 7 should be viewed only in a highly symbolic sense and not as a literal description of even the idealized pattern 34. The point that is being made is that functions on the real line, corresponding physically to a sequence of pixels derived from the two dimensional image, are obtained that represent edge intensity and edge direction such as symbolically symbolized in FIG. 7.

A Fourier power spectrum can then be generated mathematically the functions relating to the curve that might be depicted as shown in FIG. 7. A Fourier power spectrum is formed as symbolically denoted in FIG. 8, in which the Fourier frequencies of the curve of FIG. 7, are reduced to intensities. As stated above, one Fourier power spectrum is obtained for the edge intensity function and another Fourier spectrum is obtained for the edge direction function.

Finally, the last parameter, the segmentation number, is derived from comparing the known test pattern 28 to test pattern 34 as distorted by surface irregularities. A measure of the degree to which the smooth straight lines of known test pattern 28 have been broken up or segmented to produce the distorted pattern 34 can then be derived by conventional mathematical reduction.

The optical characteristics, which would be associated with the kind of parameter revealed by an edge intensity or edge direction Fourier power spectrum, can generally be summarized as corresponding to what most human observers would classify as the degree of waviness and the degree to which the image became disconnected in the reflected pattern, respectively. The decomposition of the reflected pattern is characterized by most human observers as the degree to which the straight or smooth curve lines of the test pattern were distorted and replaced by connected segmented lines. Yet, these qualitative impressions of the distorted image become quantified according to the invention.

Once this quantification of the distortion present in a reflected image is obtained according to the invention, the quantification of standard test patterns can be compared thereto through conventional statistical analysis. Each test pattern is then associated empirically with the judgments of the human panel judges as to the degree of wetness, dullness, brightness, luster and so forth according to the aesthetic qualities that are being sought or isolated. The degree of correlation with one or more standard test patterns can then be statistically and mathematically evaluated for any actual measured surface 16.

The apparatus in FIG. 1 is thus able, through this procedure, to view a painted surface and to make a judgment that would highly correlate with the judgement of a human panel, which would characterize a surface, for example, as having the desired wet, foot-deep shine.

Turn now to FIG. 2 for a second embodiment of the invention in which surface 16 is measured through a Fourier power projection. A laser 36 projects coherent light that is collimated by a collimation lens 38 to project a test pattern 40 onto surface 16. The image of test pattern 40 is reflected from surface 16 to a Fourier power lens 42, which focuses the reflected image on a Fourier power plane 44. The image of the reflected test pattern 40 is then recorded by a conventional solid state camera 18. Fourier power projection is conventional (see E. G. Steward, "Fourier Optics", sec. 5.3 at 90, Ellis Howard Ltd. 1983) and what is produced on Fourier transform plane 44 is a pattern of light bands that represent the Fourier power spectrum intensity of FIG. 7, which was obtained mathematically on computer 20 in the first embodiment of FIG. 1.

Since the test pattern is known, the power spectrum of the edge intensity and edge direction functions can be separated mathematically within computer 50 from the output of solid state camera 18. Similarly, the degree of decomposition of the test pattern is determined in the same manner as in the embodiment in FIG. 1 within computer 50 to yield the visual parameterization of the distorted and reflected test pattern.

These parameters can then be statistically correlated as in the embodiment of FIG. 1 with several reflected reference patterns developed as a standard against which to gauge the reaction of a human panel. Conventional signal processing and computation techniques may be employed for removing distortion, for generating fourier power spectra, and for correlating the power spectrum, and the appropriate technique will be chosen for a particular application by one skilled in the art using the teachings of this disclosure without departing from the scope or spirit of the invention.

It must be understood that many alterations and modifications may be made by those having ordinary skill in the art without departing from the spirit and the scope of the invention. Therefore, the illustrated embodiments have been set forth only for the purposes of example and should not be taken as limiting the invention as defined in the following claims.

We claim:

1. A method of automatically deriving a computer simulated human subjective judgment of the quality of a test surface comprising the steps of:
   storing a Fourier power spectra of line edge parameters of a test pattern reflected from at least one standardized surface, said standardized surface having a value assigned thereto according to aesthetic human judgment, said test pattern having at least one line with well defined line edges, said test pattern extending over the gross morphology of said standardized surface;
   projecting said test pattern onto said test surface;
   detecting a reflected image of said test pattern;
   generating a Fourier power spectra of said reflected image of said projected test pattern;
   using said Fourier power spectra of said reflected image to provide a plurality of said line edge parameters relating to said reflected test pattern;
   comparing said plurality of line edge parameters from said reflected test pattern from said test surface with said stored line edge parameters of said at least one standardized surface to determine the degree of correlation therewith; and
   assigning a value of human esthetic judgment to said test surface according to the degree of correlation with said standardized surface so that human esthetic judgment of said test surface is machine simulated,
   whereby automatic evaluation of said test surface substantially equivalent to human evaluation is obtained.

2. The method of claim 1 wherein said step of generating the Fourier power spectra comprises the steps of:
   recording said reflected test pattern; and
   extracting said parameters from said recording.

3. The method of claim 1 wherein said step of correlating said Fourier power spectra comprises the step of statistically correlating frequencies within said Fourier power spectra of the reflected test pattern with Fourier frequencies of at least one best pattern which has been distorted in a predetermined manner and associated with a predetermined human aesthetic evaluation.

4. The method of claim 1 wherein said parameters include segmentation information.

5. The method of claim 1 further comprising the step of using distortion determined from a best pattern to remove distortion from the reflected test pattern.

6. The method of claim 5 wherein said step of removing distortion includes the step of using a distorted best pattern and an undistorted best pattern to provide a map for removing distortion from the reflected test pattern.

7. The method of claim 1 where said step of projecting said test pattern comprises the step of projecting said test pattern with a coherent collimated light beam.

8. The method of claim 7 where said step of generating said Fourier power spectra comprises the steps of:
   receiving said reflected test pattern from said finished surface with a Fourier transform lens; and
   focusing said reflected test pattern with said Fourier transform lens onto a Fourier transform plane.

9. The method of claim 8 wherein said step of generating said Fourier power spectra further comprises the step of recording the image focused on said Fourier transform plane.

10. The method of claim 9 wherein said step of correlating comprises the step of separating said image recorded from said Fourier transform plane into components relating to edge direction frequencies and relating to edge intensity frequencies of said reflected test pattern.

11. A method of automatically deriving a computer simulated human subjective judgment of the quality of a surface comprising the steps of:
    storing a plurality of parameters determined from at least one Fourier power spectra determined during actual human evaluation of a best surface;
    projecting a test pattern onto a test surface;
    detecting a reflected image of said test pattern;
    generating Fourier power spectra of said reflected image of said projected test pattern, said step of generating the Fourier power spectra comprises the steps of recording said reflected test pattern from said test surface, and extracting said parameterization of said reflected test pattern from said recording;
    using said Fourier power spectra to provide a plurality of test optical parameters relating to said reflected test pattern; and
    correlating said plurality of test parameters with a set of corresponding parameters derived from said at least one Fourier power spectra;
    where said step of recording said reflected test pattern comprises the step of recording the image of said reflected test pattern as a two dimensional binary pixel map within a memory of a computer,
    whereby automatic evaluation of said test surface substantially equivalent to human evaluation is obtained.

12. The method of claim 11 further comprising the step of removing distortion in the reflected image due to surface irregularities.

13. The method of claim 12 wherein said step of removing distortion due to surface irregularities includes the step of subtracting from the reflected test pattern distortions associated with a test pattern which is reflected from said best surface.

14. The method of claim 11 further comprising the steps of:
    using said computer to determine the edge intensity of each binary pixel in said two dimensional binary pixel map;
    using said computer to determine the edge direction of each binary pixel within said two dimensional binary pixel map; and
    using said computer to map said detected edge intensity and edge direction so as to form corresponding edge intensity and edge direction functions.

15. The method of claim 14 further comprising the step of automatically applying a Fourier transform to said edge intensity and edge direction functions to obtain said Fourier power spectrum corresponding to each function.

16. An apparatus for providing automatic evaluation of a finished surface substantially equivalent to human aesthetic evaluation of said finished surface comprising:
    means for storing line edge parameters derived from a Fourier power spectrum of a test pattern reflected from to at lest one standardized surface which has been aesthetically judged by actual human evaluation of said standardized surface;
    means for projecting said test pattern onto said finished surface;

means for recording a reflected image of said test pattern from said finished surface;

means for digitizing said recorded image of said reflected test pattern;

means for generating line edge parameters derived from said Fourier power spectrum from said recorded image of said reflected test pattern; and means for correlating said line edge parameters of said finished surface with said stored line edge parameters corresponding to said at least one standardized surface which has been aesthetically judged by actual human aesthetic evaluation, means for assigning a value of human esthetic judgment to said finished surface according to the degree of correction found between said line edge parameters of said finished surface and said line edge parameters of said standardized surface, whereby human evaluation of said finished surface is automatically simulated.

17. The apparatus of claim 16 further comprising means for using a best pattern to remove distortion in the reflected test pattern.

18. An apparatus for providing automatic evaluation of a finished surface substantially equivalent to human aesthetic evaluation of said finished surface comprising;

means for storing best parameters derived from at least one best Fourier power spectrum determined during actual human evaluation of a best surface;

means for projecting a test pattern onto said finished surface;

means for recording a reflected test pattern from said finished surface;

means for digitizing said recorded test pattern;

means for generating test parameters derived from said Fourier power spectrum relating to said test pattern;

means for correlating said test parameters with said best parameters derived from actual human aesthetic evaluation of said finished surface;

means for digitizing the reflected test pattern into a two dimensional pixel map, whereby human evaluation of said finished surface is automatically simulated.

19. The apparatus of claim 18 wherein said means for digitizing includes means for generating an edge intensity function of said pixel map and an edge direction function of said pixel map.

20. An apparatus for automatically evaluating a surface to simulate human aesthetic evaluation of said surface comprising:

means for storing line edge parameters of a test pattern derived from at least one Fourier power spectrum of a reflected image of said test pattern corresponding to at least one standardized surface which has been aesthetically judged by actual human evaluation;

means for projecting said test pattern onto said surface with a collimated coherent beam of light;

a Fourier transform lens for focusing a reflected test pattern from said finished surface onto a Fourier transform plane;

camera means for recording said image focused onto said Fourier transform plane;

means for using said Fourier transform image to provide a plurality of line edge parameters associated with said reflected test pattern;

means for correlating said line edge parameters for said reflected test image with corresponding stored line edge parameters associated with one standardized surface which has been aesthetically judged by actual human aesthetic evaluation of the quality of said standardized surface; and means for assigning a value of human esthetic judgment to said surface according to the degree of correction found between said line edge parameters of said surface and said line edge parameters of said standardized surface.

21. The apparatus of claim 20 further comprising means for using a best image to remove distortion in the reflected image.

22. An apparatus for automatically evaluating a surface to simulate human aesthetic evaluation of said surface comprising:

means for projecting a test pattern onto said surface with a collimated coherent beam of light;

a Fourier transform lens for focusing a reflected test pattern from said finished surface onto a Fourier transform plane;

camera means for recording said image focused onto said Fourier transform plane;

means for using said Fourier transform image to provide a plurality of parameters associated with said reflected test pattern;

means for correlating said parameters for said reflected test image with corresponding parameters associated with a best surface determined by at least one actual human aesthetic evaluation of the quality of said best surface; and means for generating a measure of the segmentation of said reflected test pattern from said finished surface relative to said test pattern projected onto said finished surface as part of parameterization of said reflected test pattern form said finished surface.

* * * * *